US009448814B2

(12) United States Patent
Sherman et al.

(10) Patent No.: US 9,448,814 B2
(45) Date of Patent: Sep. 20, 2016

(54) BRIDGE SYSTEM FOR AUXILIARY DISPLAY DEVICES

(75) Inventors: Itay Sherman, Hod Hasharon (IL); Eyal Bychkov, Hod Hasharon (IL); Yaron Segalov, Tel Aviv (IL)

(73) Assignee: Google Inc., Mountain View, CA (US)

(*) Notice: Subject to any disclaimer, the term of this patent is extended or adjusted under 35 U.S.C. 154(b) by 1193 days.

(21) Appl. No.: 12/372,812

(22) Filed: Feb. 18, 2009

(65) Prior Publication Data

US 2009/0207097 A1    Aug. 20, 2009

Related U.S. Application Data

(60) Provisional application No. 61/066,179, filed on Feb. 19, 2008.

(51) Int. Cl.
| | | |
|---|---|---|
| G06F 17/00 | (2006.01) | |
| G06F 9/44 | (2006.01) | |
| G06F 17/22 | (2006.01) | |

(52) U.S. Cl.
CPC ......... *G06F 9/4445* (2013.01); *G06F 17/2247* (2013.01)

(58) Field of Classification Search
CPC .......................... G06F 9/4445; G06F 17/2247
USPC .......................................................... 715/234
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |

(Continued)

FOREIGN PATENT DOCUMENTS

| | | |
|---|---|---|
| EP | 1871075 A1 | 12/2007 |
| WO | 9421058 A1 | 9/1994 |

(Continued)

OTHER PUBLICATIONS

"Final Office Action", U.S. Appl. No. 12/850,804, Jan. 10, 2013, 13 pages.

(Continued)

*Primary Examiner* — Laurie Ries
(74) *Attorney, Agent, or Firm* — Wolfe-SBMC

(57) ABSTRACT

A bridge system for auxiliary display devices, including a computer running a plurality of mini-programs, each mini-program sending information to a corresponding auxiliary display device, a plurality of auxiliary display devices, each auxiliary display device including an auxiliary screen and each auxiliary display device having look & feel display parameters, for receiving information from the corresponding plurality of mini-programs, and for displaying the received information on the auxiliary screens according to the corresponding look & feel parameters, and at least one bridge device, each bridge device including a bridge screen, and each bridge device receiving information from a corresponding at least one of the mini-programs, forwarding the received information to the at least one of the auxiliary display devices, and displaying the received information on the bridge screen according to the look & feel display parameters of the at least one of the auxiliary display devices.

12 Claims, 12 Drawing Sheets

(56) References Cited

U.S. PATENT DOCUMENTS

| | | | |
|---|---|---|---|
| 6,201,867 B1 | 3/2001 | Koike | |
| 6,243,578 B1 | 6/2001 | Koike | |
| 6,285,823 B1* | 9/2001 | Saeki | G09B 5/065 386/241 |
| 6,300,947 B1 | 10/2001 | Kanevsky | |
| 6,477,357 B1 | 11/2002 | Cook | |
| 6,516,202 B1 | 2/2003 | Hawkins et al. | |
| 6,640,113 B1 | 10/2003 | Shin et al. | |
| 6,690,947 B1 | 2/2004 | Tom | |
| 6,760,415 B2 | 7/2004 | Beecroft | |
| 6,834,192 B1* | 12/2004 | Watanabe | H04W 36/00 370/331 |
| 6,898,283 B2 | 5/2005 | Wycherley et al. | |
| 6,907,264 B1 | 6/2005 | Sterkel | |
| 6,999,792 B2 | 2/2006 | Warren | |
| 7,020,704 B1* | 3/2006 | Lipscomb | H04L 29/06027 709/217 |
| 7,085,542 B2 | 8/2006 | Dietrich et al. | |
| 7,194,285 B2 | 3/2007 | Tom | |
| 7,194,752 B1* | 3/2007 | Kenyon | G10L 25/48 382/118 |
| 7,266,391 B2 | 9/2007 | Warren | |
| 7,275,244 B1 | 9/2007 | Charles Bell et al. | |
| 7,477,919 B2 | 1/2009 | Warren | |
| 7,515,937 B2 | 4/2009 | Lee | |
| 7,571,014 B1* | 8/2009 | Lambourne | H04R 27/00 700/94 |
| 7,747,338 B2* | 6/2010 | Korhonen | H04M 1/7253 455/3.06 |
| 7,784,065 B2* | 8/2010 | Polivy | G06F 1/1613 719/328 |
| 8,316,308 B2* | 11/2012 | Sherman | G06F 3/0238 715/744 |
| 8,457,118 B2* | 6/2013 | Bychkov | H04M 1/2535 370/354 |
| 8,463,875 B2* | 6/2013 | Katz | G06F 3/165 709/219 |
| 9,083,846 B2 | 7/2015 | Bychkov | |
| 2001/0055951 A1* | 12/2001 | Slotznick | H04M 1/215 455/41.3 |
| 2002/0090980 A1 | 7/2002 | Wilcox et al. | |
| 2002/0151327 A1 | 10/2002 | Levitt | |
| 2003/0008563 A1* | 1/2003 | Nishio et al. | 439/625 |
| 2003/0107529 A1* | 6/2003 | Hayhurst | G06F 1/1613 345/1.1 |
| 2003/0200001 A1* | 10/2003 | Goddard | H04L 12/2803 700/94 |
| 2004/0042601 A1* | 3/2004 | Miao | H04M 3/567 379/202.01 |
| 2004/0052501 A1* | 3/2004 | Tam | H04N 7/181 386/240 |
| 2004/0156616 A1* | 8/2004 | Strub | G11B 27/031 386/224 |
| 2004/0233930 A1 | 11/2004 | Colby, Jr. | |
| 2004/0268005 A1 | 12/2004 | Dickie | |
| 2005/0064860 A1 | 3/2005 | DeLine | |
| 2005/0070225 A1* | 3/2005 | Lee | H04W 88/02 455/41.3 |
| 2005/0091359 A1* | 4/2005 | Soin et al. | 709/223 |
| 2005/0159184 A1 | 7/2005 | Kerner et al. | |
| 2005/0231392 A1* | 10/2005 | Meehan | G09B 29/007 340/995.1 |
| 2005/0276570 A1 | 12/2005 | Reed et al. | |
| 2005/0276750 A1* | 12/2005 | Ziv | A61K 49/0002 424/1.11 |
| 2006/0003804 A1 | 1/2006 | Liu | |
| 2006/0026652 A1* | 2/2006 | Pulitzer | G06F 3/005 725/80 |
| 2006/0033809 A1* | 2/2006 | Farley | H04M 3/428 348/14.01 |
| 2006/0072694 A1* | 4/2006 | Dai | H04J 3/0667 375/354 |
| 2006/0075439 A1* | 4/2006 | Vance | H04L 29/06027 725/81 |
| 2006/0105722 A1 | 5/2006 | Kumar | |
| 2006/0123053 A1 | 6/2006 | Scannell, Jr. | |
| 2006/0130075 A1* | 6/2006 | Rhoten et al. | 719/328 |
| 2006/0190321 A1 | 8/2006 | Martins Nicho et al. | |
| 2006/0235872 A1 | 10/2006 | Kline et al. | |
| 2006/0241353 A1 | 10/2006 | Makino et al. | |
| 2006/0242590 A1* | 10/2006 | Polivy | G06F 17/30905 715/760 |
| 2007/0004450 A1* | 1/2007 | Parikh | G06F 1/1626 455/556.1 |
| 2007/0018957 A1 | 1/2007 | Seo | |
| 2007/0053653 A1* | 3/2007 | Huntington | H04N 5/76 386/231 |
| 2007/0072589 A1 | 3/2007 | Clarke | |
| 2007/0079030 A1 | 4/2007 | Okuley et al. | |
| 2007/0139514 A1 | 6/2007 | Marley | |
| 2007/0161404 A1 | 7/2007 | Yasujima et al. | |
| 2007/0195158 A1 | 8/2007 | Kies | |
| 2007/0211907 A1* | 9/2007 | Eo | H04R 5/04 381/79 |
| 2007/0226734 A1 | 9/2007 | Lin et al. | |
| 2007/0288583 A1 | 12/2007 | Rensin et al. | |
| 2008/0009325 A1 | 1/2008 | Zinn et al. | |
| 2008/0013659 A1* | 1/2008 | Kim | H04J 3/0682 375/354 |
| 2008/0013802 A1* | 1/2008 | Lee | G06F 3/011 382/118 |
| 2008/0019522 A1* | 1/2008 | Proctor | H04W 4/06 380/255 |
| 2008/0026794 A1* | 1/2008 | Warren | H04M 1/72527 455/557 |
| 2008/0030304 A1* | 2/2008 | Doan | H04M 1/7253 340/10.1 |
| 2008/0037674 A1* | 2/2008 | Zurek | H04L 29/06027 375/262 |
| 2008/0040354 A1 | 2/2008 | Ray et al. | |
| 2008/0056285 A1* | 3/2008 | Quinn et al. | 370/401 |
| 2008/0120401 A1* | 5/2008 | Panabaker | H04L 63/104 709/223 |
| 2008/0140886 A1 | 6/2008 | Izutsu | |
| 2008/0152165 A1* | 6/2008 | Zacchi | H04R 5/04 381/77 |
| 2008/0168368 A1* | 7/2008 | Louch et al. | 715/764 |
| 2008/0212649 A1* | 9/2008 | Jougit | H04W 88/06 375/130 |
| 2008/0307315 A1* | 12/2008 | Sherman | G06F 3/0238 715/744 |
| 2009/0002191 A1* | 1/2009 | Kitaura | H04N 5/44513 340/12.26 |
| 2009/0010485 A1* | 1/2009 | Lamb | H04N 7/148 382/100 |
| 2009/0158382 A1* | 6/2009 | Shaffer | H04H 20/57 725/131 |
| 2009/0210491 A1* | 8/2009 | Thakkar | H04L 12/1822 709/204 |
| 2009/0286570 A1* | 11/2009 | Pierce, Jr. | G06Q 30/06 455/556.1 |
| 2010/0003921 A1* | 1/2010 | Godlewski | H04W 76/062 455/67.11 |
| 2010/0041330 A1* | 2/2010 | Elg | H04M 1/72522 455/3.06 |
| 2010/0093401 A1* | 4/2010 | Moran et al. | 455/566 |
| 2011/0047247 A1* | 2/2011 | Katz | G11B 27/10 709/219 |
| 2011/0164105 A1* | 7/2011 | Lee | H04N 7/142 348/14.02 |
| 2011/0208807 A1* | 8/2011 | Shaffer | G06F 3/0418 709/203 |
| 2011/0280142 A1* | 11/2011 | Bychkov | H04M 1/2535 370/252 |
| 2012/0314777 A1* | 12/2012 | Zhang | H04N 21/43632 375/240.26 |
| 2013/0036366 A1* | 2/2013 | Sherman | G06F 3/0238 715/744 |
| 2013/0258038 A1* | 10/2013 | Bychkov | H04M 1/2535 348/14.02 |
| 2015/0288922 A1* | 10/2015 | Bychkov | H04M 1/2535 348/14.02 |

(56) References Cited

U.S. PATENT DOCUMENTS

FOREIGN PATENT DOCUMENTS

| WO | 0059247 A1 | 10/2000 |
|---|---|---|
| WO | 0186922 A1 | 11/2001 |
| WO | 03103174 A1 | 12/2003 |

OTHER PUBLICATIONS

"Non-Final Office Action", U.S. Appl. No. 12/134,221, Nov. 15, 2011, 8 pages.
"Non-Final Office Action", U.S. Appl. No. 12/850,804, Oct. 26, 2012, 12 pages.
"Non-Final Office Action", U.S. Appl. No. 13/101,358, Jan. 9, 2013, 9 pages.
"Non-Final Office Action", U.S. Appl. No. 13/612,879, Oct. 22, 2015, 9 pages.
"Non-Final Office Action", U.S. Appl. No. 13/887,450, Jul. 8, 2015, 10 pages.
"Non-Final Office Action", U.S. Appl. No. 13/895,396, Nov. 20, 2014, 11 pages.
"Non-Final Office Action", U.S. Appl. No. 13/895,396, Dec. 16, 2014, 8 pages.
"Non-Final Office Action", U.S. Appl. No. 14/745,405, Oct. 21, 2015, 9 pages.
"Notice of Allowance", U.S. Appl. No. 12/134,221, Jul. 25, 2012, 7 pages.
"Notice of Allowance", U.S. Appl. No. 12/850,804, Feb. 6, 2013, 12 pages.
"Notice of Allowance", U.S. Appl. No. 13/101,358, Feb. 19, 2013, 8 pages.
"Notice of Allowance", U.S. Appl. No. 13/895,396, Mar. 19, 2015, 10 pages.
"Restriction Requirement", U.S. Appl. No. 12/134,221, Aug. 2, 2011, 6 pages.
"Restriction Requirement", U.S. Appl. No. 12/850,804, Oct. 3, 2012, 5 pages.
"Restriction Requirement", U.S. Appl. No. 13/612,879, Sep. 9, 2015, 6 pages.
"Final Office Action", U.S. Appl. No. 13/887,450, Feb. 25, 2016, 10 pages.
"Final Office Action", U.S. Appl. No. 14/745,405, Apr. 1, 2016, 12 pages.
"Final Office Action", U.S. Appl. No. 13/612,879, Apr. 26, 2016, 9 pages.
Non-Final Office Action, U.S. Appl. No. 14/745,405, Aug. 5, 2016, 12 pages.

* cited by examiner

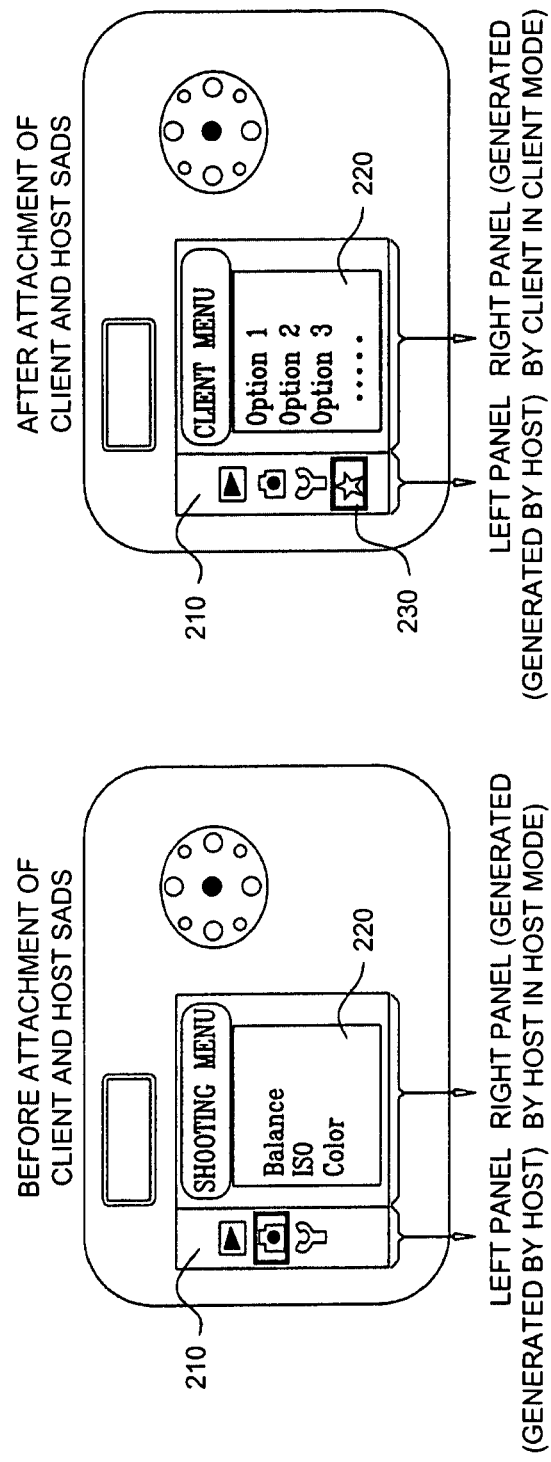

AFTER ATTACHMENT OF CLIENT AND HOST SADS

BEFORE ATTACHMENT OF CLIENT AND HOST SADS

BRIDGE SYSTEM FOR AUXILIARY DISPLAY DEVICES

FIELD OF THE INVENTION

The field of the present invention is electronic devices that are coupled together in a multi-source system.

BACKGROUND OF THE INVENTION

A standalone device (SAD) is generally fully operative by itself, and can be selectively configured by a user. The SAD may or may not have its own user interface for setting its configuration. When the SAD does not have its own user interface, an external host, such as a PC computer, is used to configure the SAD. Selection of a configuration generally affects functionality of the SAD, since different configurations correspond to different features.

For systems that include combinations of two or more inter-connected SADs, setting of their respective configurations is complicated. Such systems are common in consumer electronics and include inter alia, an MP3 player connected to a PC, a digital camera connected to a PC, a digital camera connected to a printer, and a router connected to a PC. Generally, when two SADs are inter-connected, either:

i. each SAD is self-configured, and the two SADs merely exchange data; or
  ii. one of the SAD's is defined as a host and the other SAD is defined as a client.

Conventional client-host systems of inter-connected SADs use one of two methods for configuration; namely, a "driver method" and a "screen method".

The driver method is used in cases where a user runs an application that controls the client behavior from a PC host, such as an MP3 player connected to a PC computer. According to the driver method, the host SAD is loaded at the time of connecting the host with the client, or pre-loaded beforehand, with a software stack referred to as a "driver". The driver instructs the host how to send commands to the client. Drivers may be implemented at different software levels, from low level operating system (OS) drivers to application level drivers with user interfaces. A host SAD loaded with a driver is able to control the client SAD, and to configure operations of the client SAD using a communication channel between the host and the client.

Drivers are generally customized for specific operating systems, but are not customized for specific client device original equipment manufacturers (OEMs).

The screen method is used in cases where a user browses a configuration screen at a designated IP address, such as a router or a printer connected to a PC computer. According to the screen method, the host SAD displays a graphics screen that includes information transferred from the client SAD. The host itself is unaware of the content displayed on its screen to the user, or of the actions performed by the user. The screen method generally uses internal browsers that are installed in host SADs, and obviates the need for OEMs to develop their own dedicated OS drivers.

For a given client SAD, the same configuration screen is displayed for any host SAD connected therewith, since the screen corresponds to the client SAD, which not need be aware of the specific host that is being used to configure it.

Both the driver method and the screen method are client-specific and, as such, are unable to provide a uniform "look & feel" for a user. A look & feel refers to visual elements that are presented in a user interface, and include inter alia font, background color, menu design, position and shape of buttons and other controls, and arrangement of various options. As a result of this drawback, the user experiences different interfaces when he switches from a host configuration screen to a client configuration screen.

SUMMARY OF THE DESCRIPTION

Aspects of the present invention overcome drawbacks of conventional multi-source systems, and provide methods and systems for inter-connecting two or more SADs that communicate with one another, in such a way as to maintain a unified user interface look & feel. Using the present invention, a user experiences the same-looking interface when he switches from a host configuration screen to a client configuration screen. Both screens have the same look & feel, and a client SAD appears transparent to the user and does not appear as a foreign device.

Using the present invention, a client SAD is aware of the specific host SAD connected thereto, and adapts its screen graphics to the host's user interface. As such, the same user interface displays both host and client configurations and a unified look & feel is maintained.

The present invention is of particular advantage with multi-source systems where a client SAD is connected to one of multiple host SAD's. Methods of the present invention ensure that the user experiences a homogenous look & feel in each host SAD source, when he navigates from the host configuration screen to the client configuration screen.

The present invention provides methods and systems for on-line configuration of controlled software, which flexibly support a client connected to one of multiple hosts yet retain the same operational control over the client, and which adapt the look & feel so as to integrate the client control software in the host software environment in a homogeneous way. A host SAD is used to configure the multi-source system, and the host user interface is maintained as a fixed point of reference for the user. Adaptation to the host user interface is carried out in each client SAD.

The present invention is advantageous for a network of auxiliary display devices connected to a computer. The present invention introduces a bridge device that displays information on the bridge device screen according to the look & feel of auxiliary display devices connected thereto. As such, the present invention enhances the SideShow™ architecture of Microsoft, by enabling a bridge device to display a plurality of display device's information, and by enabling one display device to display another display device's information, with the look & feel of the other display device.

There is thus provided in accordance with an embodiment of the present invention a bridge system for auxiliary display devices connected to a computer, including a computer running a plurality of mini-programs, each mini-program sending information of a specific nature from the computer to a corresponding auxiliary display device, for presentation to a user, a plurality of auxiliary display devices, each auxiliary display device including an auxiliary screen and each auxiliary display device having look & feel display parameters, for receiving information from the corresponding plurality of mini-programs, and for displaying the received information on the auxiliary screens according to the corresponding look & feel parameters, and at least one bridge device coupled to the computer, each bridge device coupled to at least one of the auxiliary display devices, each bridge device including a bridge screen, and each bridge device receiving information from a corresponding at least one of the mini-programs, forwarding the received information to the at least one of the auxiliary display devices, and displaying the received information on the bridge screen according to the look & feel display parameters of the at least one of the auxiliary display devices.

There is further provided in accordance with an embodiment of the present invention a method for managing auxiliary display devices connected to a computer, including receiving XML information of a specific nature from a mini-program running on a computer, and receiving look & feel parameters from an auxiliary display device that displays information in a display format conforming to the look & feel parameters, for presentation to a user, transforming the XML information to a BMP image conforming to the look & feel parameters of the auxiliary display device, transmitting the BMP image to the auxiliary display device for presentation to the user, receiving an indication of an action performed by the user on the auxiliary display device in response to viewing the BMP image, generating a second BMP image based on the received indication, conforming to the look & feel parameters of the auxiliary display device, and further transmitting the second BMP image to the auxiliary display device for further presentation to the user.

There is yet further provided in accordance with an embodiment of the present invention a method for managing auxiliary display devices connected to a computer, including receiving XML information of a specific nature from a mini-program running on a computer, and receiving look & feel parameters from an auxiliary display device that displays information in a display format conforming to the look & feel parameters, for presentation to a user, transforming the XML information to a BMP image conforming to the look & feel parameters of the auxiliary display device, transmitting the BMP image to the auxiliary display device for presentation to the user, receiving additional XML information from the mini-program, generating a second BMP image based on the additional XML information, conforming to the look & feel parameters of the auxiliary display device, and further transmitting the second BMP image to the auxiliary display device for further presentation to the user.

BRIEF DESCRIPTION OF THE DRAWINGS

The present invention will be more fully understood and appreciated from the following detailed description, taken in conjunction with the drawings in which:

FIGS. 1A and 1B, FIGS. 2A and 2B, and FIGS. 3A and 3B are displays of various configuration screens for a host SAD and a client SAD connected together within a multi-source system, wherein the host and client screens are controlled so as to have the same look & feel, in accordance with an embodiment of the present invention;

DETAILED DESCRIPTION

Aspects of the present invention relate to multi-source systems with inter-connected standalone devices (SADs), where one of the SADs serves as a host device, and is used to configure itself and to configure the client devices in the system. Using the present invention, the client devices adapt the look & feel of their configuration screens so as to conform to the look & feel of the host configuration screen. The host interface look & feel thereby serves as a fixed and familiar point of reference for a user of the multi-source system.

The look & feel of an interface relates to visual elements that a user experiences when he interacts with the interface. The look & feel includes inter alia:

screen size (pixel width and height);
font type, font size, font color and other visual font characteristics;
background color and background pattern (e.g., BMP or JPG image, or multiple images for animation);
menu type (e.g., scroll with items selected marked by highlight or zoom);
transitional entry effects (e.g., flip, zoom);
screen and button topology (e.g., location of specific buttons on the screen, such as the X button at the top-right corner of a window for closing the window);
menu topology (e.g., location of items in a specific menu); and
screen template (e.g., usage and position of general progress keys, such as Next, Back, Cancel and Enter).

In accordance with an embodiment of the present invention, look & feel parameters may be defined in an XML document. Such an XML document make, for example, take the form provided below.

Sample XML document with look & feel parameters

```
<definitions>
<screen>
        <size=800*600>
        <touch=yes>
        <layout=portrait>
        <color quality=32 bit>
        ..... .
</screen>
<background>
        <color = black>
        <pattern = none>
        ..... .
</background>
<fonts>
        <font1>
                <color=yellow>
                <size=16>
                <type=bold italic>
                ......
        </font1>
```

| Sample XML document with look & feel parameters |
| --- |
| ```
       <font2>
              <color=blue>
              <size=12>
              <type=regular>
              ......
       </font2>
       ...
    </fonts>
    ...
    <buttons>
       <button1>
              <location=bottom left>
              <icon="left_arrow.jpg">
       </button1>
       <button2>
              <location=bottom right>
              <icon="right_arrow. jpg">
       </button2>
    </buttons>
    ...
    </definitions>
``` |

Figure 1B:
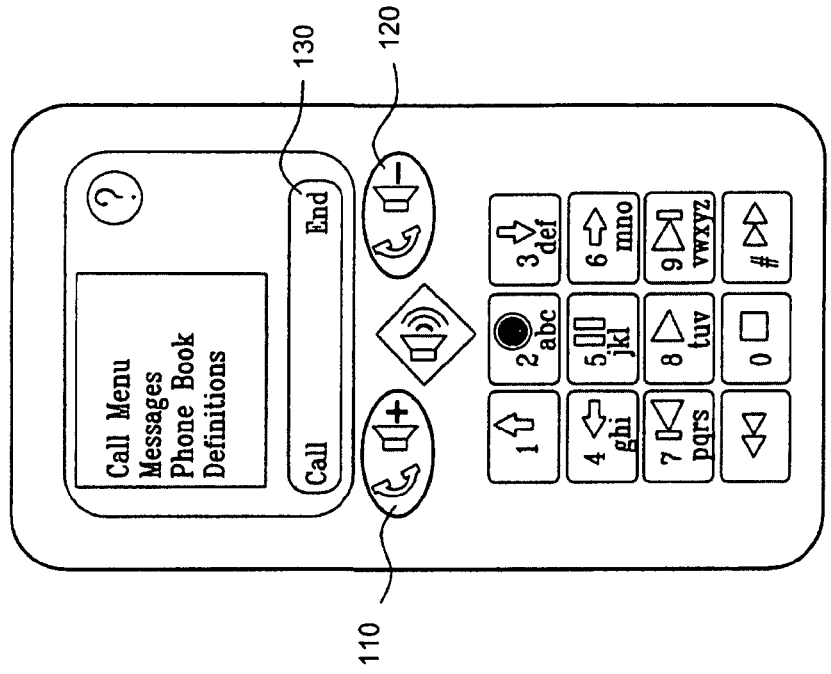
Figure 1A:
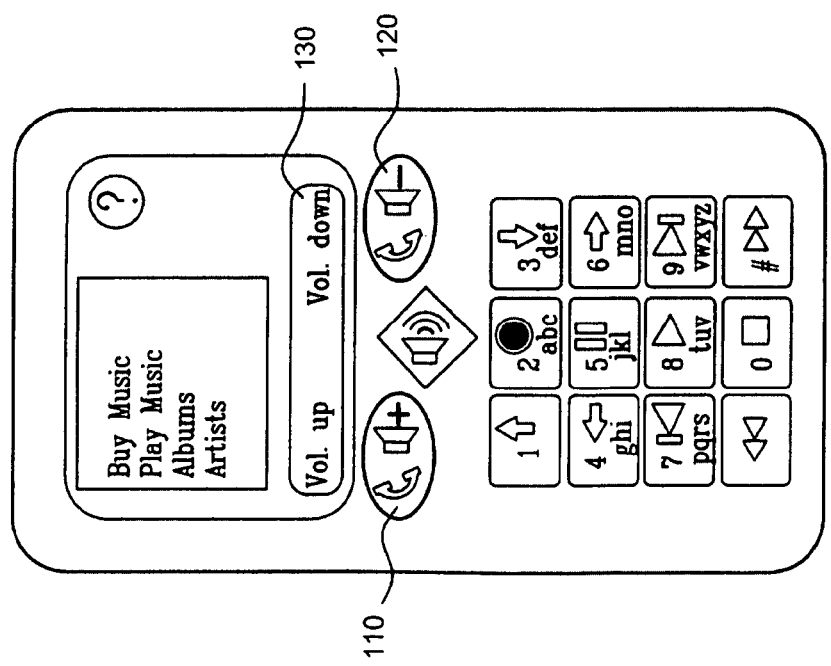

Reference is now made to FIGS. 1A and 1B, FIGS. 2A and 2B, and FIGS. 3A and 3B, which are displays of various configuration screens for a host SAD and a client SAD connected together within a multi-source system, wherein the host and client screens are controlled so as to have the same look & feel, in accordance with an embodiment of the present invention. The host shown in FIG. 1A is a media player, such as an MP3 player, and the client shown in FIG. 1B is a cell phone. Shown in FIG. 1A is a sample interface for the host. The screen shown in FIG. 1A corresponds to the host configuration screen, before the client is connected to the host, and the screen shown in FIG. 1B corresponds to the client configuration screen, after the client is connected to the host. It is noted that both screens have the same look & feel. Specifically, when the client SAD is attached to the host SAD, the font size, type and color remain the same, and the screen size and background color remain the same.

In addition, the screen template is preserved for two "soft-keys" 110 and 120 and a bar 130 above them that includes their corresponding function names. Soft keys are multi-function keys that use part of a display to identify their function at any moment. Soft-keys are generally located directly below the display. In FIG. 1A soft keys 110 and 120 correspond respectively to Vol. Up and Vol. Down functions, as indicated by bar 130; and in FIG. 1B soft keys 110 and 120 correspond respectively to Call and End functions, respectively, as indicated by bar 130.

The host shown in FIG. 2A is a digital camera, and the client shown in FIG. 2B is another electronic device. Shown in FIG. 2A is a sample interface for the host. Again, in accordance with the present invention, the look & feel of FIG. 2B (client configuration) is the same as that of FIG. 2A (host configuration). As may be seen in FIGS. 2A and 2B, the look & feel of the configuration interface includes a left panel 210 a right panel 220. The left panel 210 is created by the host. When the client is attached to the host, the left panel may be altered by the host. Thus in FIG. 2B the left panel includes a control element 230 in the shape of a star, for toggling between host mode and client mode.

The right panel 220 is controlled by the host when the host mode is running, and controlled by the client when the client mode is running. In either case, the content displayed in the right panel conforms to the look & feel parameters for the host. The "look parameters" of the right panel, including inter alia the dimensions of the right panel, its background color, its font type, size and color, and its menu header and location, are the same in FIGS. 2A and 2B. Similarly, the "feel" parameters of the right panel, including inter alia assignment of client options 1, 2 and 3 to corresponding host buttons and the jog dial options, are also the same in FIGS. 2A and 2B.

Figure 3B:
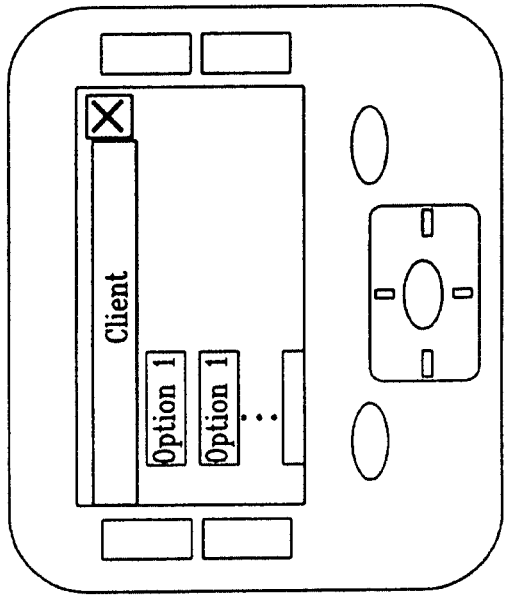
Figure 3A:
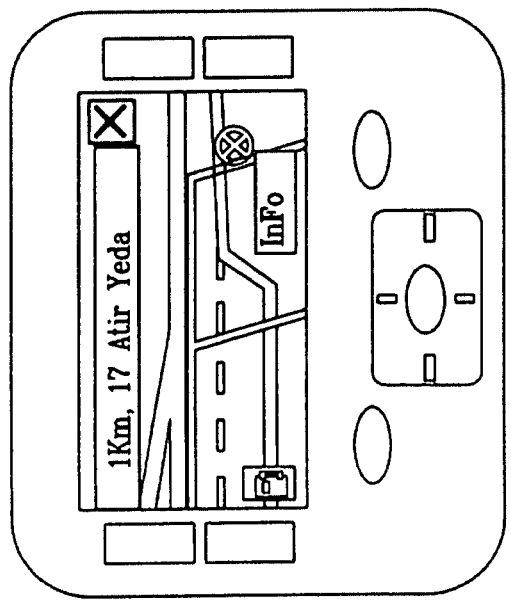

The host shown in FIG. 3A is a GPS navigator, and the client shown in FIG. 3B is another electronic device. Shown in FIG. 3A is a sample interface for the host. Again, in accordance with the present invention, the look & feel of FIG. 3B (client configuration) is the same as that of FIG. 3A (host configuration). For example, it is noted that the "X" remains in the top right corner when the client is attached to the host.

Figure 4:
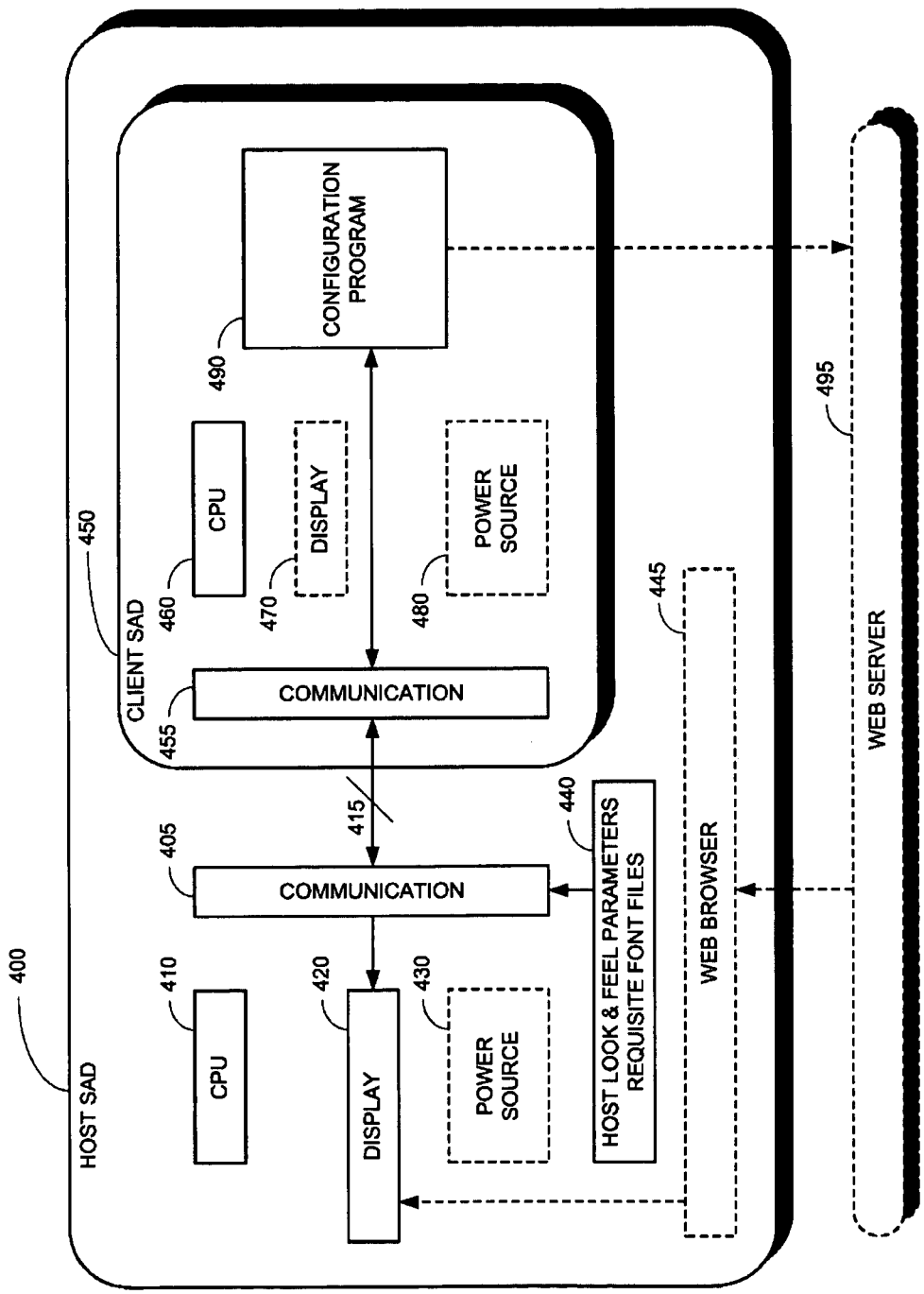
FIG. 4 is a simplified block diagram of a multi-source system with a uniform interface for configuring a host and a client, in accordance with an embodiment of the present invention.

More generally, reference is now made to FIG. 4, which is a simplified block diagram of a multi-source system with a uniform interface for configuring a host and a client, in accordance with an embodiment of the present invention. Shown in FIG. 4 is a host SAD 400, which includes a CPU 410, a display 420 and an optional power source 430. Host SAD 400 has its own look & feel parameters 440 stored therein. In accordance with an embodiment of the present invention, requisite font files are also stored with look & feel parameters 440.

Also shown in FIG. 4 is a client SAD 450. Client SAD includes a CPU 460, an optional display 470 and an optional power source 480. Client SAD also includes a configuration program 490, which enables a user to select configuration settings for client SAD 450.

Host SAD 400 and client SAD 450 communicate via respective communication modules 405 and 455 over a communication channel 415. Communication channel 415 may be a physical or a wireless channel. Host look & feel parameters 440 are transmitted by communication module 405 over communication channel 415, and received by communication module 455. In turn, the look & feel parameters are transmitted to configuration program 490.

Configuration program 490 has a default screen look & feel. In accordance with an embodiment of the present invention, configuration program 490 adapts its look & feel accordingly, so as to conform to look & feel parameters 440 of host SAD 400. Configuration program 490 generates a graphics screen image that conforms to look & feel parameters 440. The graphics screen image is transmitted to communication module 455, which transmits it further to communication module 405 over communication channel 415. The graphics image is then transmitted to host display 420, for display to a user.

As the user interacts with the displayed graphics image and issues successive commands, the commands are transmitted via communication channel 415 back to configuration program 490, which generates successive graphics screen images in response to the user commands. The successive graphics screen images, based again on look & feel parameters 440, are transmitted to display 420 for further display to the user.

Figure 5A:
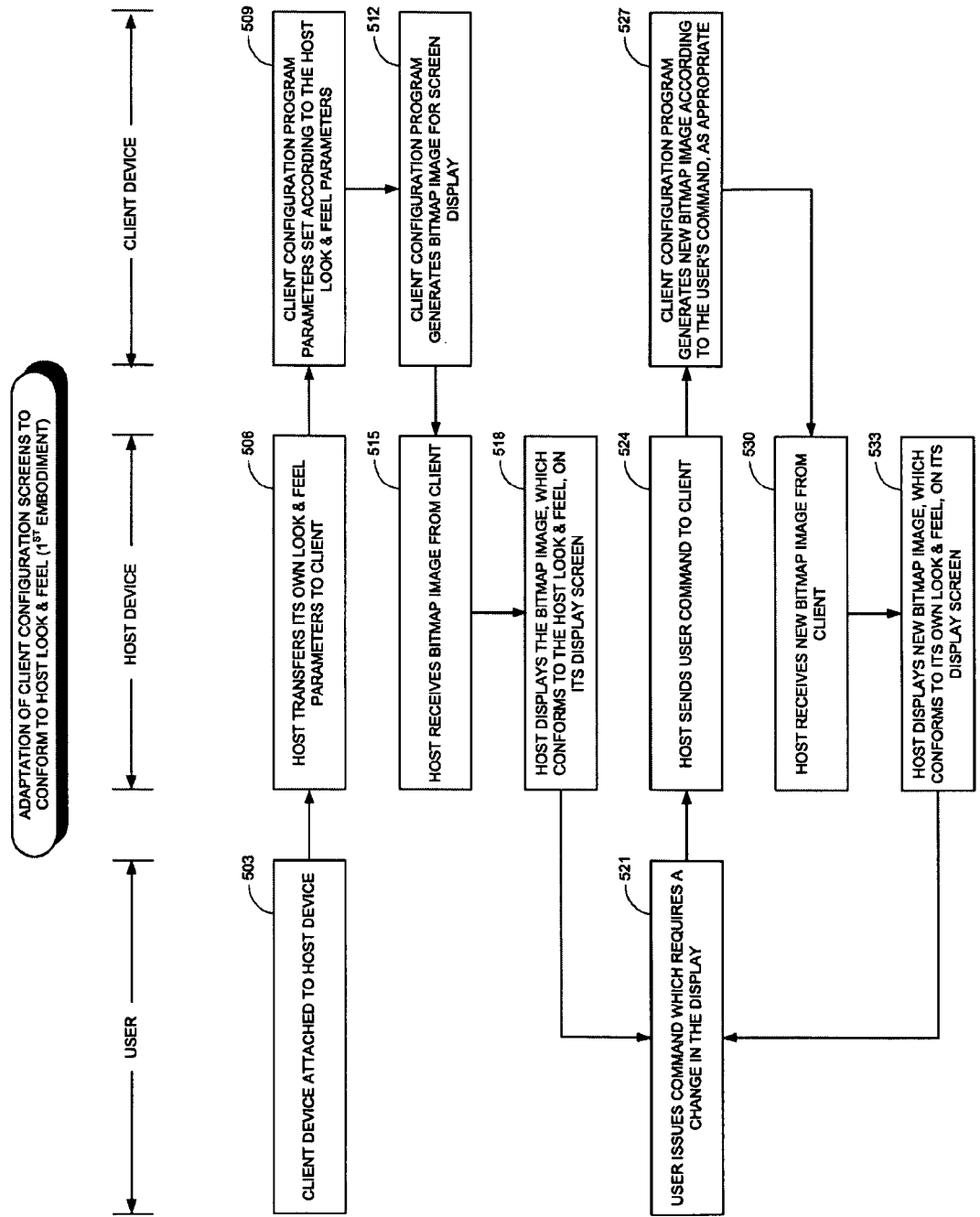
FIGS. 5A, 5B and 5C are simplified flowcharts of three embodiments of a method for controlling a configuration interface for a client SAD so as to conform to the look & feel of a configuration interface for a host SAD, in accordance with an embodiment of the present invention.

Reference is now made to FIG. 5A, which is a simplified flowchart of a first embodiment of a method for controlling a configuration interface for a client SAD so as to conform to the look & feel of a configuration interface for a host SAD, in accordance with an embodiment of the present invention. The flowchart of FIG. 5A is divided into three columns. The leftmost column indicates steps performed by a user who is operating a multi-source system including the host SAD and the client SAD. The middle column indicates steps performed by the host SAD, and the rightmost column indicates steps performed by the client SAD.

At step 503 the client device is attached to the host device. At step 506 the host transfers its own look & feel parameters to the client. As described hereinabove, the host look & feel parameters may be specified in an XML document. The host may also transfer requisite font files, for fonts specified in the look & feel parameters.

At step 509 the client adapts the look & feel of its configuration program according to the host look & feel parameters. At step 512 the client configuration program generates a configuration screen, in the form of a bitmap image, that conforms to the look & feel of the host configuration screen.

At step 515 the host receives the bitmap image of the configuration screen from the client, and at step 518 the host displays the bitmap image, which conforms to the host look & feel. As such, the user interface displayed by the host preserves a unified look & feel, even when being used to configure the client.

It may thus be appreciated that the host displays its own configuration options and the client configuration options on the same screen, and with a common look & feel. The host may display both configurations at the same time, or may switch between host options and client options, but in each case the same visual user interface is presented to the user.

At step 521 the user interacts with the system and issues a command, the response to which may require a change in the display screen. At step 524 the host sends the client notification of the user command. At step 527 the client configuration program generates a new bitmap image for a configuration screen, in response to the user command, as appropriate. At step 530 the host receives the new configuration screen, in the form of the new bitmap image, from the client. Finally, at step 533 the host displays the altered screen, which again conforms to the look & feel of the host. The method then returns to step 521, as the user continues to interact with the system.

Figure 5B:
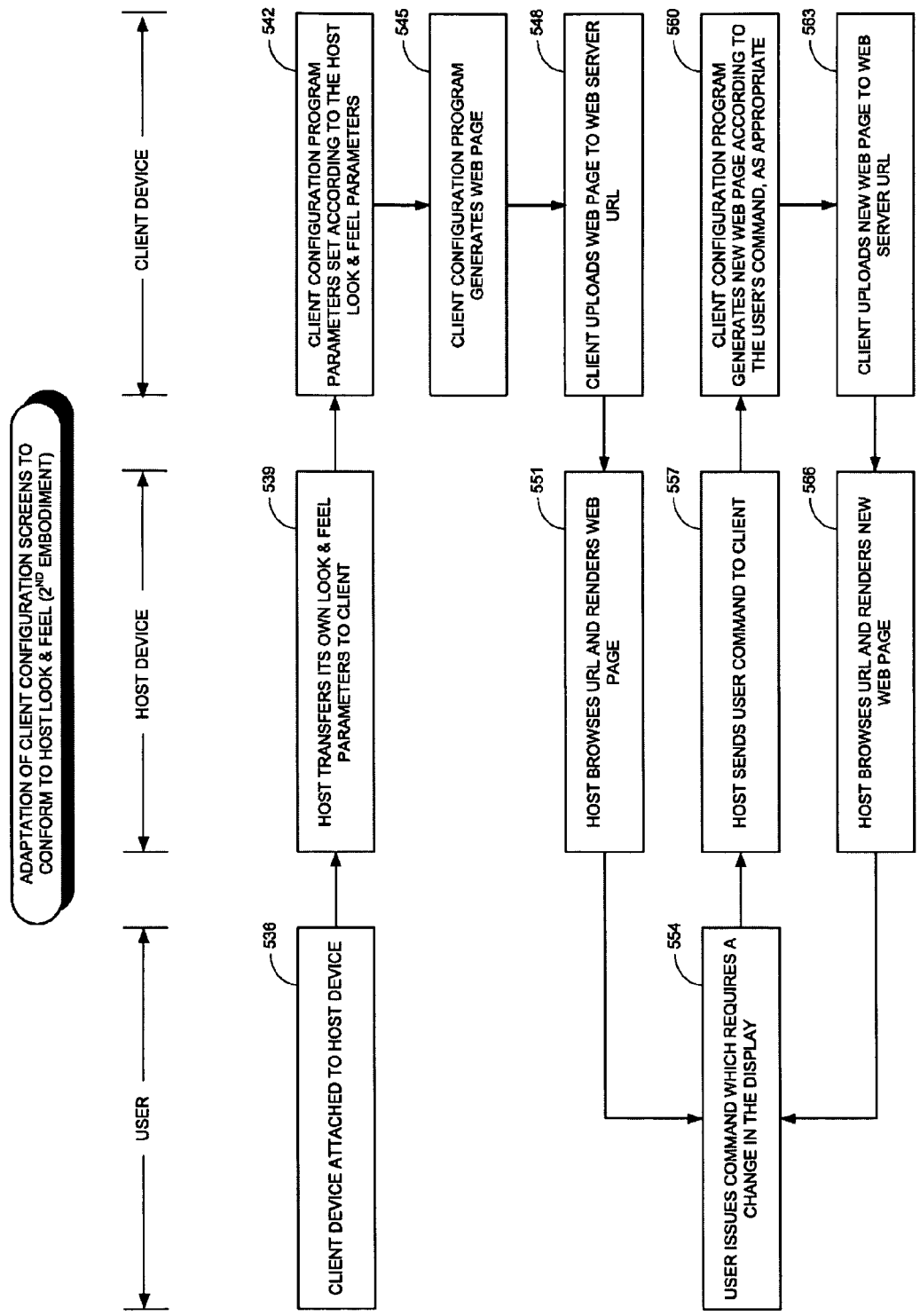

Reference is now made to FIG. 5B, which is a simplified flowchart of a second embodiment of a method for controlling a configuration interface for a client SAD so as to conform to the look & feel of a configuration interface for a host SAD, in accordance with an embodiment of the present invention. The flowchart of FIG. 5B is divided into three columns. The leftmost column indicates steps performed by a user who is operating a multi-source system including the host SAD and the client SAD. The middle column indicates steps performed by the host SAD, and the rightmost column indicates steps performed by the client SAD. The method of FIG. 5B uses a web interface for a user to configure the client device.

At step 536 the client device is attached to the host device. At step 539 the host device transfers its look & feel parameters to the client device. The host may also transfer requisite font files, for fonts specified in the look & feel parameters. At step 542 the client configuration program sets it parameters according to the host look & feel parameters.

At step 545 the client configuration program generates a web page, which conforms to the host look & feel parameters. At step 548 the client device uploads the web page to a URL on a web server. At step 551 the host, using a web browser installed therein, browses the URL and renders and displays the web page.

Referring back to FIG. 4, in this second embodiment host device 400 includes a web browser 445, which browses and renders web pages stored in a web server 495. The web pages are generated by configuration program 490 so as to comply with host look & feel parameters 440, and are uploaded to web server 495.

Proceeding now with FIG. 5, at step 554 a user who is viewing the web page displayed at step 551 issues a user command. At step 557 the host sends the user command to the client. At step 560 the client configuration program generates a new web page, in response to the user command, as appropriate. At step 563 the client uploads the web page to a URL on the web server. At step 566 the host browses the URL and renders and displays the new web page. The method then returns to step 554, as the user continues to interact with the system.

Figure 5C:
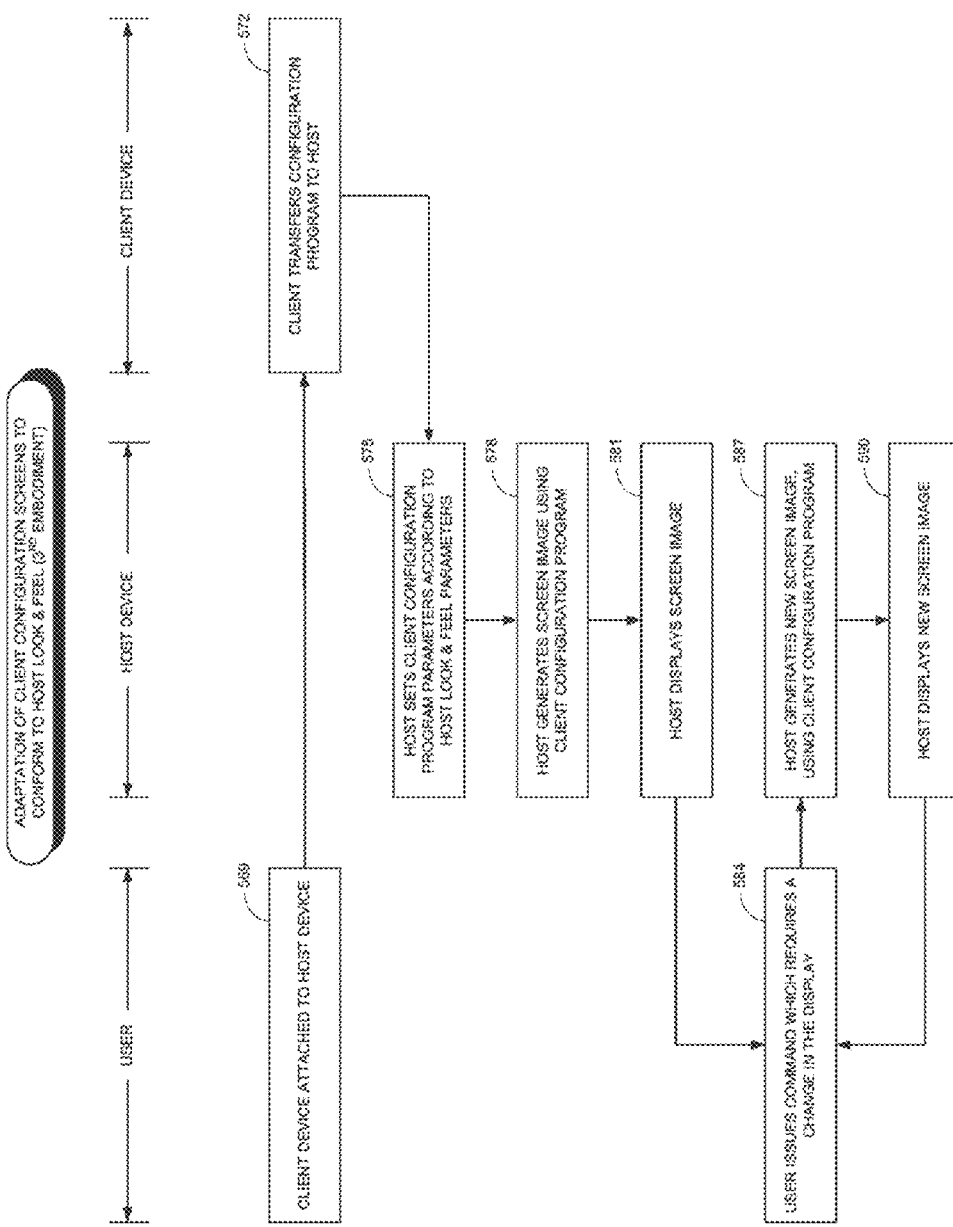

Reference is now made to FIG. 5C, which is a simplified flowchart of a third embodiment of a method for controlling a configuration interface for a client SAD so as to conform to the look & feel of a configuration interface for a host SAD, in accordance with an embodiment of the present invention. The flowchart of FIG. 5C is divided into three columns. The leftmost column indicates steps performed by a user who is operating a multi-source system including the host SAD and the client SAD. The middle column indicates steps performed by the host SAD, and the rightmost column indicates steps performed by the client SAD.

At step 569 the client device is attached to the host device. At step 572 the client transfers its configuration program to the host, thus enabling the host to generate the appropriate user interfaces.

At step 575 the host sets parameters of the client's configuration program corresponding to the host look & feel parameters. At step 578 the host by itself generates a screen image for client configuration, running the client's configuration program. At step 581 the host displays the screen image.

At step 584 a user who is viewing and interacting with the user interface issues a command. At step 587 the host generates a new screen image, in response to the user command, as appropriate, running the client's configuration program. At step 590 the host displays the new screen image. The method then returns to step 584, as the user continues to interact with the system.

It will thus be appreciated by those skilled in the art that the methods of FIGS. 5A, 5B and 5C enable a host SAD in a multi-source system to display both host configuration settings and client configuration settings on the host screen, simultaneously, with a uniform look & feel. As such, a user of the system experiences a homogeneous interface, and it is transparent to the user that two different SADs are operating.

Implementation Details

Shown in TABLES IA and IB are example button key assignments for a host mode and a client mode, respectively, within a multi-source system. TABLES IA and IB correspond to FIGS. 1A and 1B, respectively, where the host is an MP3 player running in media player mode, and the client is a cell phone running in dialer mode. The buttons of the system are labeled B1-B15, together with a TOUCH button on the touch screen displayed with a question mark. The buttons have one assignment of functions in host mode and another assignment of functions in client mode. Button B8, for example, is assigned a play function in TABLE IA, and is assigned a function to enter the numeral "8" in TABLE IB.

Figure 6:
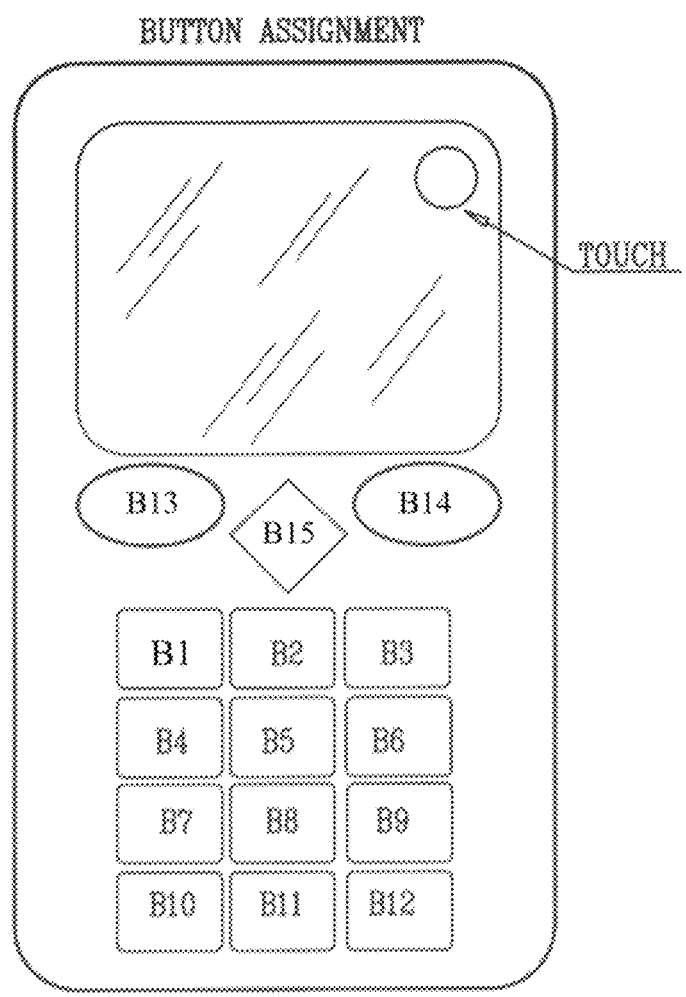
FIG. 6 is an illustration of button keys for a multi-source system that have different key assignments for host mode and client mode, but a common look & feel user interface for setting host and client configuration parameters, in accordance with an embodiment of the present invention.

Reference is now made to FIG. 6, which is an illustration of button keys for a multi-source system that have different key assignments for host mode and client mode, but a common look & feel user interface for setting host and client configuration parameters, in accordance with an embodiment of the present invention. As shown in FIG. 6, buttons B1-B12 correspond to the four rows of three buttons on the keypad, in the order from top left to bottom right. Buttons B13 and B14 correspond to the soft keys 110 and 120 in FIGS. 1A and 1B. Button B15 corresponds to the speaker button.

It is also noted that buttons B4, B6, B13 and B14 have dual functions, corresponding to a short duration press and a long duration press. Key-press and key-release events may be analyzed so as to distinguish between long duration and short duration presses.

When running in host mode, the key assignments correspond to media player key assignments, as in TABLE IA. However, when running in client mode, the key assignments correspond to conventional cell phone key assignments, as in TABLE IB. It may be seen from TABLE IA that in host mode, buttons B5 and B15 are not used, and long button presses are not distinguished from short presses.

TABLE IA

Media Player Key Assignments

| Screen | Function | Assigned Key |
| --- | --- | --- |
| Media Player Mode | Play | B8 |
| | Stop | B11 |
| | Next | B9 |
| | Prev | B7 |
| | FWD | B12 |
| | BKD | B10 |
| | Record | B2 |
| | Vol. Up | B13 |
| | Vol. Down | B14 |
| | Up | B1 |
| | Down | B3 |
| | Right | B6 |
| | Left | B4 |
| | Help | TOUCH |

TABLE IB

Dialer Key Assignments

| Screen | Function | Assigned Key |
| --- | --- | --- |
| Dialer Mode | 0 | B11 |
| | 1 | B1 |
| | 2 | B2 |
| | 3 | B3 |
| | 4 | B4 |
| | 5 | B5 |
| | 6 | B6 |
| | 7 | B7 |
| | 8 | B8 |
| | 9 | B9 |
| | # | B12 |
| | * | B10 |
| | Left | LONG B4 |
| | Right | LONG B6 |
| | Call | B13 |
| | End | B14 |
| | Erase | LONG B14 |
| | Options | LONG B13 |
| | Speaker | B15 |
| | Help | TOUCH |

In accordance with the present invention, when the client device is not attached to the host device, or when the client device is attached to the host device but the multi-source system is running in host mode, the host key assignments, such as shot indicated in TABLE IA, are used. Switching between host mode and client mode may be performed, for example, using a toggle switch such as control element 230 in FIG. 2B. When the client device is attached to the host device, the client sends the host a list of user functions it supports, such as the various functions indicated in TABLE IB. The host then assigns the functions to buttons, and sends the client the key assignments.

When the client is attached to the host and the multi-source system is running in client mode, the graphic image displayed on the host screen, or a portion of the graphic image that is assigned to the client, is generated by the client and transmitted to the host for display. When the user presses a button, the button press event is sent to the client, and translated by the client according to the key assignment for that button. If the user presses a touch screen, then the X-Y coordinates of the press location are send to the client. In response, the client generates a new graphic image, conforming to the look & feel parameters that the client received from the host. The new graphic image is transmitted to the host for display, thus completing a cycle of user input and screen display in response to the input. Generally, several such cycles are performed in an interactive session.

When the key assignments distinguish between short and long duration presses, as in TABLE IB, the host may do the analysis to make the distinction and pass the result (long press or short press) to the client. In an alternative embodiment, the host may send the key-press and key-release events to the client, and the client then determines the type of press (long or short) from these events.

Bridges for Connecting Auxiliary Displays to a Computer

Figure 7:
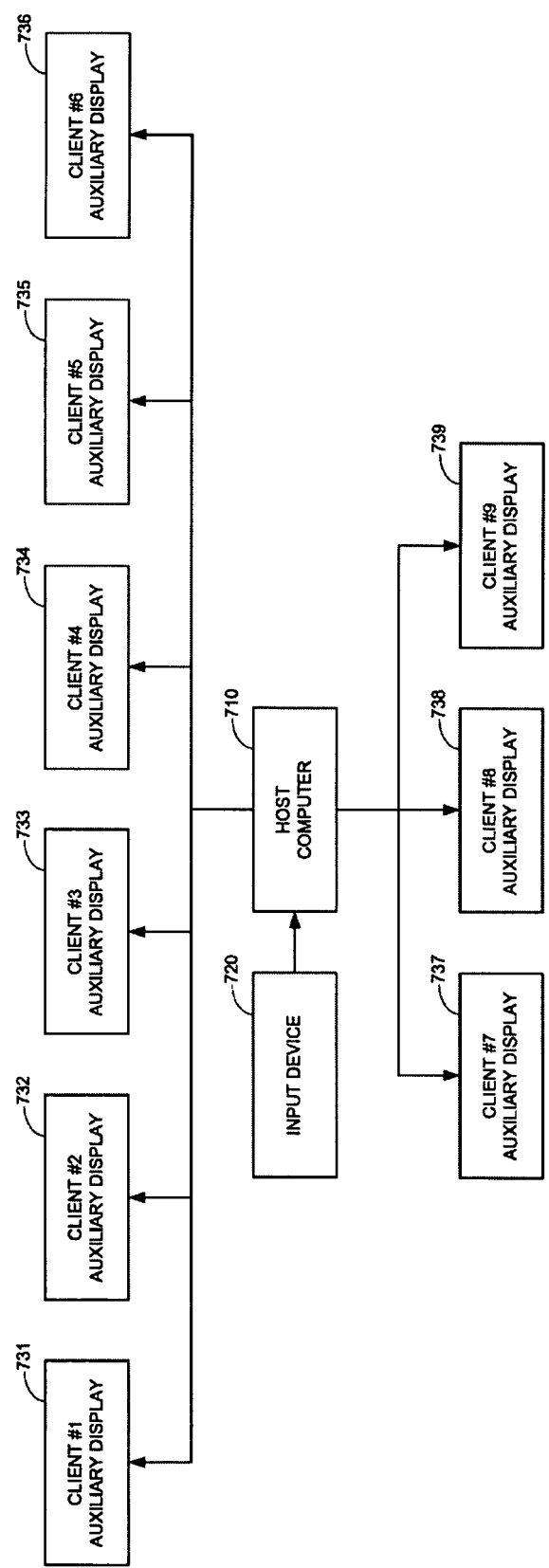
FIG. 7 is a prior art block diagram of auxiliary display devices connected to a computer.

The present invention applies to a network of auxiliary display devices connected to a PC computer. In this regard, reference is now made to FIG. 7, which is a prior art block diagram of auxiliary display devices connected to a computer. Shown in FIG. 7 is a computer 710 with an input device 720 such as a keyboard or mouse. Computer 710 is connected to multiple auxiliary display devices 731-739. Each auxiliary display device is used to display information stored on computer 710, such as e-mail messages, calendar reminders, or such other notifications. Auxiliary display devices 731-739 include inter alia mobile phones, GPS navigators, remote controls with built-in screens, keyboards with built-in screens, wearable display devices, music players, digital picture frames, game stations, home entertainment systems, and such other consumer electronic (CE) devices.

An auxiliary display device may be embedded within computer 710, such as an in-lid attached laptop display. An auxiliary display device may be a separate peripheral device connected to computer 710 by a wired or wireless connection, including inter alia USB, Bluetooth, TCP/IP or other such data communication protocols, existing now or to be developed in the future. An auxiliary display device may also be a designated area within a main screen of computer 710.

Microsoft Corporation of Redmond, Wash., recently introduced its SideShow™ technology into Windows Vista®, which enables developers to write mini-applications on computer 710 that send appropriate data from computer 710 to auxiliary display devices 731-739, as required by the display devices. These mini-applications, referred to as "gadgets", communicate with Windows SideShow application programming interfaces (APIs), and are independent of the software layers below them. Examples of such gadgets include (i) a calendar gadget that periodically retrieves data from a calendar application such as Microsoft Outlook®, sends the data to an auxiliary display device, (ii) a weather gadget that retrieves data from a web service and updates an auxiliary display device with weather information in designated locales, and (iii) an instant messaging gadget that provides presence information regarding a user's buddies on an auxiliary display device.

Microsoft SideShow requires that auxiliary display devices 731-739 be able to interpret the Simple Content Format (SCF) and, optionally the iCalendar data format. SCF defines a set of XML elements and attributes that allow content, dialog and menu pages to be sent to auxiliary devices 731-739. In addition, SCF enables extended custom content types to be defined.

Auxiliary display devices 731-739 may be powered even when computer 710 is in a low-power mode such as standby mode or hibernate mode.

Auxiliary display devices 731-739 behave as client devices, which receive their data from their corresponding gadgets running on computer 710, which behaves as a host. This is indicated in FIG. 7 by referring to display devices 731-739 as client #1-client #9, respectively, and by referring to computer 710 as host computer. The designation of a device as host or client in FIG. 7 relates to the display of information. A host device sends display information to a client device, which the client device displays on its screen. Display devices 731-739 do not manipulate data that they display, and such data remains within the auxiliary display devices and is not transmitted elsewhere. Moreover, if an auxiliary display device has an internal application, then such application is not shared with other devices. As such, display devices 731-739 are dumb terminals.

Figure 8:
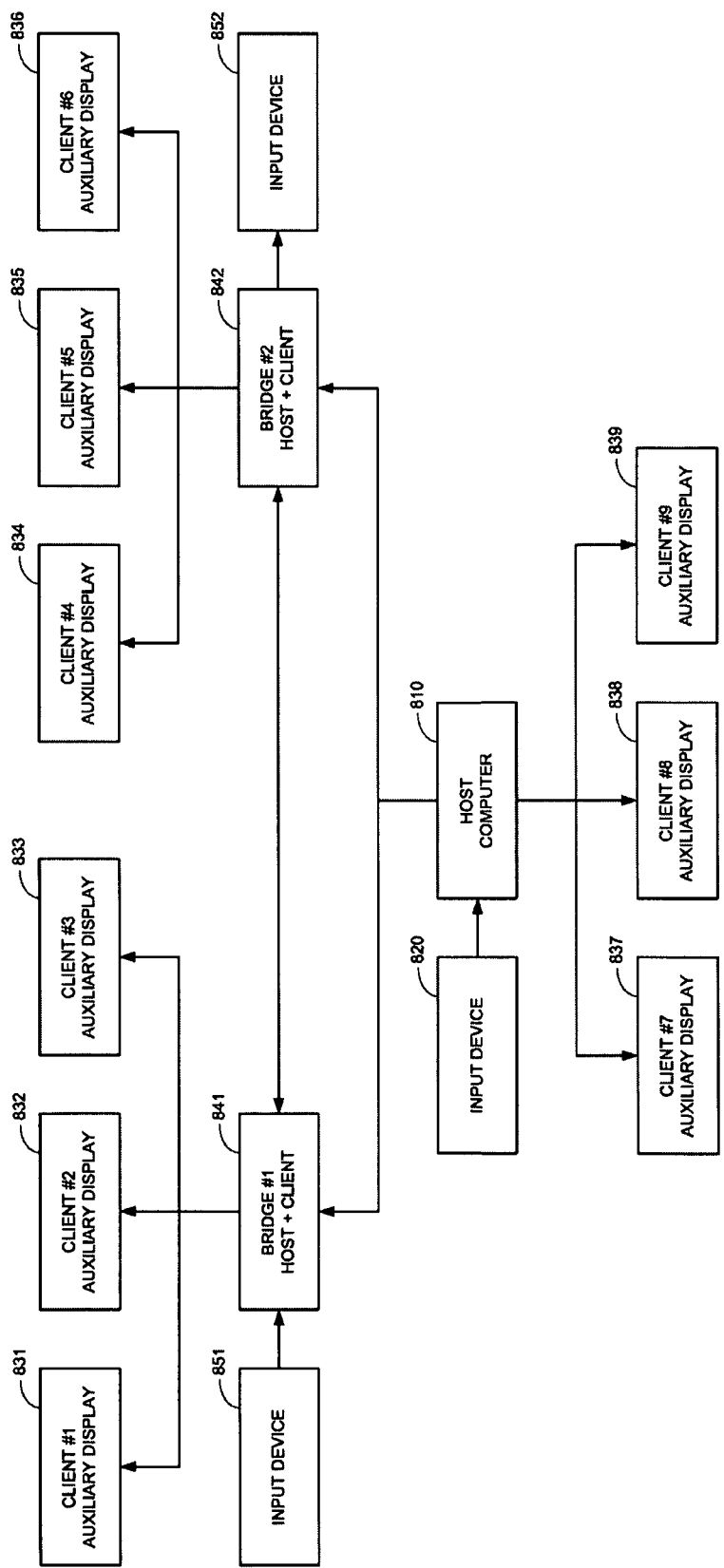
FIG. 8 is a simplified block diagram of auxiliary display devices and bridge devices connected to a computer, in accordance with an embodiment of the present invention.

Reference is now made to FIG. 8, which is a simplified block diagram of auxiliary display devices and bridge devices connected to a computer, in accordance with an embodiment of the present invention. Shown in FIG. 8 is a computer 810 with an input device 820 such as a keyboard or mouse, and auxiliary display devices 831-839. FIG. 8 also includes two devices 841 and 842, referred to as bridges, with respective input devices 851 and 852. Bridges 841 and 842 are connected directly to computer 810 and connected directly to one another. Auxiliary display devices are arranged so that devices 831-833 are connected to bridge 841, devices 834-836 are connected to bridge 842, and devices 837-839 are connected directly to computer 810.

Bridges own two types of gadgets; namely, (i) gadgets generated from their own internal running applications, and (ii) gadgets inherited from other devices. For example, bridge 841 owns its own gadgets, as well as gadgets inherited from host computer 810 and from bridge 842. Auxiliary display devices generally do not own gadgets, and can only display information from gadgets that are presented to them.

Bridge devices 841 and 842 combine capabilities of host computer 810 and client devices 831-839. As clients, bridge devices 841 and 842 receive display information from other devices and present the display information on their own screens. As hosts, bridge devices 841 and 842 act as sources of display information for display on client device screens. For example, bridge 841 may receive display information from computer 810 or from clients 842 and 843 831-833 and display such information on its own screen; and conversely, bridge 841 may transmit display information to computer 810 or to clients 842 and 843 831-833 for display on their screens. Display information transmitted by bridge 841 may be generated by bridge 841 from internal applications running on device 841, or may be information received from other devices. Moreover, bridge 841 can combine display information that it generates from its internal applications with display information that it receives from remote devices, the latter referred to as "inherited notifications", so as to create single display information for devices that connect to bridge 841.

In accordance with an embodiment of the present invention, computer 810 connects to bridges 841 and 842 via wireless links. Although display information is rendered as a bitmap image, it is cumbersome to transmit bitmap images over wireless links, due to their large sizes. Instead, computer 810 transmits display information to bridges 841 and 842 in a compressed XML format. Auxiliary display devices 831-839 generally have limited CPU power and limited software resources, and may only support simpler data, such as BMP image data. In such cases, bridges 841 and 842 transform the display information they receive in compressed XML format to a BMP format, for forwarding to display devices 831-839.

Further in accordance with an embodiment of the present invention, such transformation uses look & feel parameters appropriate to each corresponding display device, as described hereinabove with reference to FIGS. 5A-5C. The XML→BMP transformation performed by bridges 841 and 842 uses configuration information provided by each corresponding target display device, such as the sample XML document described hereinabove, in transforming the compressed XML data to a BMP image for the target display device.

Bridges 841 and 842 may split their displays to include both display information provided by computer 810, as well as display information generated from internal applications running on bridges 841 and 842.

It is noted that the architecture of FIG. 8 enables clients 831-839 to display gadget information that does not originate from host computer 810. As such preferably each bridge device maintains an assignment table that holds data defining which device owns which gadget and which client performs an operation that requires a change of display. General notifications, such as a new e-mail message transmitted by an e-mail gadget, are distributed to all clients 831-839 that use this e-mail gadget. TABLE II is a sample assignment table maintained by bridge device 841.

TABLE II

| Sample Assignment Table Maintained by Bridge #1 | | |
|---|---|---|
| Gadget | Owner | Notifications for Change of Display |
| E-mail | Client #1 | Client #2, Client #3 |
| Calendar | Client #2 | Client #1 |
| Weather | Client #3 | |

Figure 9:
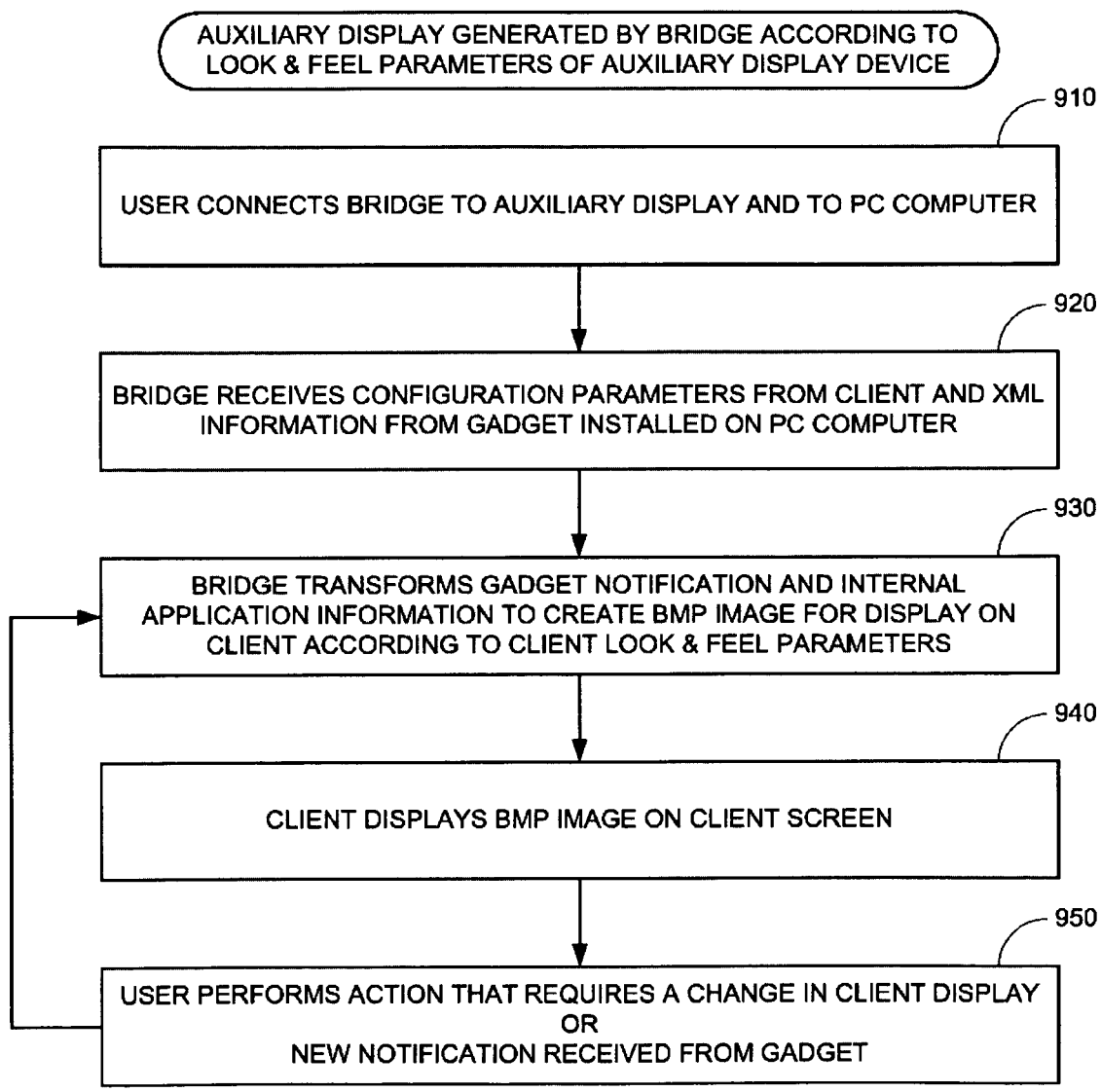
FIG. 9 is a simplified flow chart of a method for generating a display on a bridge device according to look & feel parameters of an auxiliary display device.

Reference is now made to FIG. 9, which is a simplified flow chart of a method for generating a display on a bridge device according to look & feel parameters of an auxiliary display device. At step 910 a user connects a bridge, such as bridge 841, to an auxiliary display device, such as client 831, and to a PC computer, such as computer 810. At step 920 the bridge receives look & feel configuration parameters from client 831, and XML display information from the gadget installed on computer 810 for device 831.

At step 930 the bridge transforms the XML display information along with display information generated by applications internal to the bridge, to generate a BMP image for display on the client device, wherein the BMP image conforms to the client device's look & feel parameters. At step 940 the client device displays the BMP image received from the bridge on its client screen. At step 950 the user interacts with the client device and performs an action that requires a change in display. Alternatively, at step 950 a notification is received from the gadget for device 831. In either case, the method proceeds to step 930 where the bridge generates a new BMP accordingly, as appropriate. Thus the cycle of user interaction/new notifications←→new BMP image continues.

Referring back to the prior art block diagram of FIG. 7, it is noted that control over which display information is targeted to which client 731-739 is controlled by computer 710. Computer 710 acts as a "crossbar switch", routing gadget data to devices. A user of computer 710 configures the exact display information that is presented to each of the connected auxiliary display devices 731-739.

In accordance with an embodiment of the present invention, control over such display configuration is extended. Referring now to FIG. 8, each host device in FIG. 8 may define which gadgets it wishes to expose to devices connected to it. The host device further designates whether each connected device either (i) has permission to further export the gadget display information to devices that are connected to it, or else (ii) is limited to displaying the gadget display information only on its own display. Such an extended display configuration is set up using a utility presented to the user referred to herein as a gadget configuration utility, or as a "gadget configuration gadget".

A bridge device, such as bridge 841 is a host and, as such has its own gadget configuration utility. The bridge presents the user with bridge internal applications that generate display information, and gadgets provided by hosts connected to the bridge, for those gadgets for which the bridge is permitted to forward their display information. Thus bridge 841, for example, presents the user with its internal applications that generate display information, and with those gadgets for host 810 and bridge 842, for which host 810 and bridge 842 are permitted to forward the gadget's display information to bridge 841.

Figure 10:
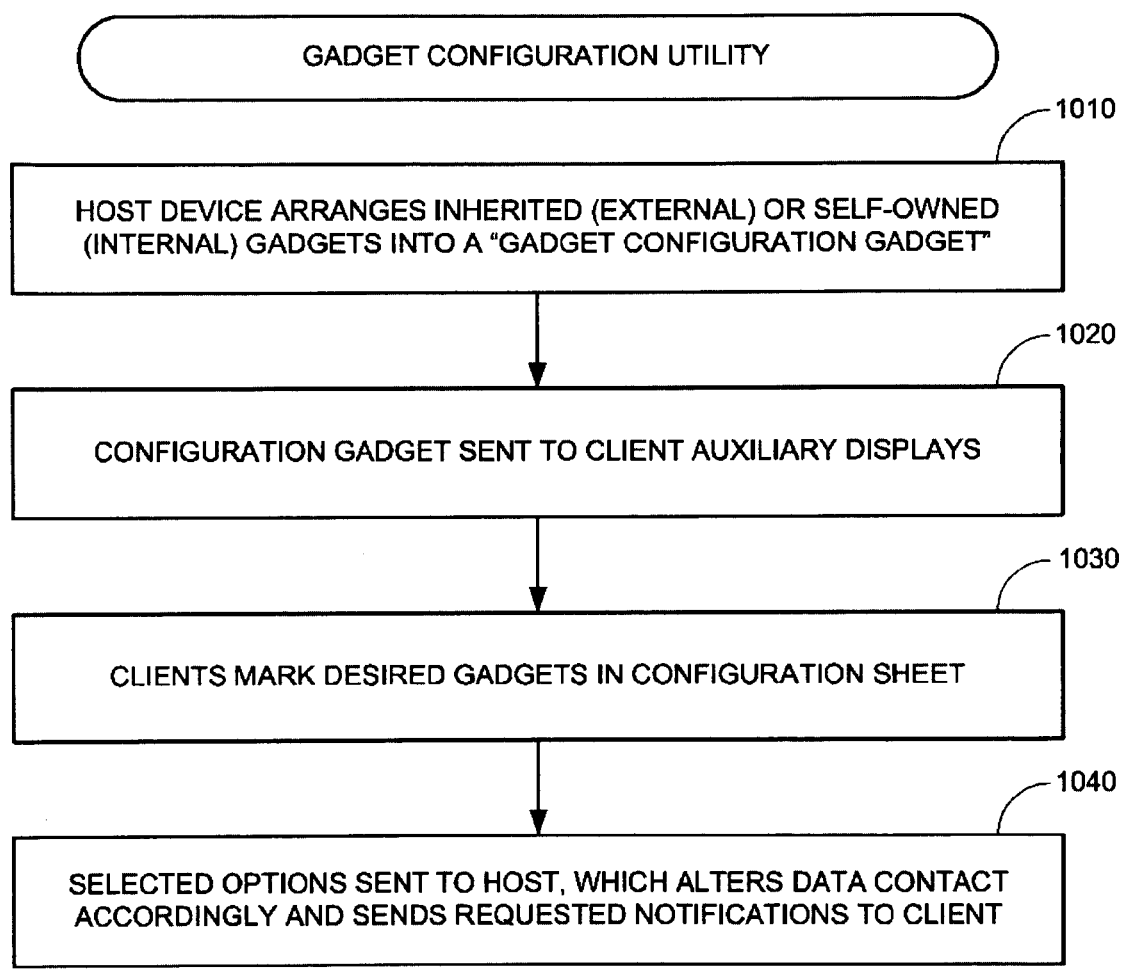
FIG. 10 is a simplified flow chart of a method for a client to control the display information sent to it by a host, in accordance with an embodiment of the present invention.

A client, such as auxiliary display device 831, is not responsible for configuring gadgets. However, in accordance with an embodiment of the present invention, a host may define its own configuration utility as a gadget, which in turn enables the client to control the display information sent to it by the host. In this regard, reference is now made to FIG. 10, which is a simplified flow chart for a method for a client to control the display information sent to it by a host, in accordance with an embodiment of the present invention. At step 1010 a host device arranges its self-owned (internal) gadgets and its inherited (external) gadgets into a gadget configuration gadget. At step 1020 the host device's gadget configuration gadget is sent to client auxiliary displays. At step 1030 a user of the client selects desired gadgets in a configuration display window. At step 1040 the user's selections are sent to the host, which alters its data content accordingly, and sends requested notifications to the client.

For example, referring to FIG. 8, at step 1020 auxiliary display devices 834-836 display gadgets on host computer 810, on bridge 841 and on bridge 842, via bridge 842; and at step 1030 the user can select some or all of these gadgets.

It will thus be appreciated by those skilled in the art that by implementing auxiliary display devices as bridges, display information may be shared between the display devices. In distinction, client devices in prior art architectures behave as passive isolated displays. For example, using the present invention, if client 831 is a GPS device, client 832 is an audio player, and client 833 is a mobile phone, and if these clients are implemented as bridges connected to one another, then each client device 831, 832 and 833 is able to review the other clients' displays.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A bridge system for auxiliary display devices, comprising:
   a computer running a plurality of mini-programs, each mini-program generating display information of a specific nature for presentation to a user on one or more auxiliary display devices, wherein at least one of the mini-programs is a mini-program-configuration (MPC) mini-program for which the display information that it generates corresponds to a configuration interface via which a user can select at least one of the other mini-programs;
   a plurality of auxiliary display devices, each auxiliary display device comprising a dumb terminal, comprising:
      a data connection for receiving, from at least one bridge device, image data for display, and for transmitting user input in response to the image data;
      an auxiliary screen for displaying the received image data; and
      an input terminal for receiving user input in response to display of the received image data; and
   at least one separate bridge hardware device coupled to said computer, each bridge device also coupled to a corresponding at least one of said auxiliary display devices, each bridge device comprising:
      a receiver for receiving, from said computer, the display information generated by at least one of the mini-programs, the display information being formatted in a mark-up language;
      a transformer for transforming the received display information formatted in the mark-up language to corresponding image data; and
      a transmitter for transmitting the thus-transformed image data for each such mini-program to those auxiliary display devices coupled to the bridge device, that selected that mini-program via the MPC mini-program.

2. The bridge system of claim 1 further comprising a configuration manager running on said computer, for setting up a configuration of which ones of said bridge devices are to receive information from which ones of the mini-programs, and wherein each bridge device receives the generated display information from only those mini-programs for which it is configured to receive information.

3. The bridge system of claim 1 wherein said plurality of auxiliary display devices includes an e-mail reader.

4. The bridge system of claim 1 wherein said plurality of auxiliary display devices includes a calendar scheduler.

5. The bridge system of claim 1 wherein said plurality of auxiliary display devices includes a GPS navigator.

6. The bridge system of claim 1 wherein said plurality of auxiliary display devices includes a weather reporter.

7. The bridge system of claim 1 wherein said plurality of auxiliary display devices includes a home entertainment system.

8. The bridge system of claim 1 wherein said plurality of auxiliary display devices includes a digital picture frame.

9. The bridge system of claim 1 wherein said plurality of auxiliary display devices includes a portable music player.

10. The bridge system of claim 1 wherein said plurality of auxiliary display devices includes a cellular telephone.

11. A computer-based method for managing auxiliary display devices connected to a computer, comprising:
- receiving from a computer, by a separate bridge hardware device that bridges the computer with a plurality of auxiliary display devices, display information for a configuration interface, the display information being formatted in a mark-up language, wherein each auxiliary display device is a dumb terminal comprising a data connection for receiving image data from the bridge device and for transmitting, to the bridge device, user input in response to the image data, an auxiliary screen for displaying the received image data, and an input terminal for receiving user input in response to display of the image data;
- transforming, by the bridge device, the received display information for the configuration interface, formatted in the mark-up language, to corresponding image data for the configuration interface;
- sending, by the bridge device, the thus-transformed image data for the configuration interface to each of the auxiliary display devices;
- receiving, by the bridge device from each of the auxiliary display devices, user selections from the configuration interface indicating one or more of a plurality of mini-programs that generate display information of a specific nature; and
- for each one of the mini-programs:
  - receiving, by the bridge device, display information generated by the mini-program and formatted in the mark-up language;
  - transforming, by the bridge device, the received display information formatted in the mark-up language to corresponding image data; and
  - transmitting, by the bridge device, the thus-transformed image data to those ones of the auxiliary display devices that selected that mini-program in accordance with the received user selections.

12. The method of claim 11 wherein the display information generated by the mini-programs comprises at least one member of the group consisting of e-mail information, calendar schedule information, GPS navigational information, weather information, a movie, a picture, a song, and voice data.

* * * * *